July 30, 1929.  J. C. PETTIT  1,722,943
SEPARATOR
Filed June 25, 1926  3 Sheets-Sheet 3

James C. Pettit
INVENTOR

BY Victor J. Evans
ATTORNEY

WITNESS:

Patented July 30, 1929.

1,722,943

UNITED STATES PATENT OFFICE.

JAMES C. PETTIT, OF BLACKSTONE, VIRGINIA, ASSIGNOR OF ONE-THIRD TO CLAUDE MULLENAX AND ONE-THIRD TO BENHAM MORRISS, BOTH OF BLACKSTONE, VIRGINIA.

SEPARATOR.

Application filed June 25, 1926. Serial No. 118,573.

This invention relates to grain separators and is an improvement upon a portion of the subject matter disclosed in an application for patent for grain separators filed by me January 15, 1926, Serial No. 81,500 patented Nov. 30, 1926, No. 1,609,188.

An object of the present invention is to provide a machine by means of which smut grain, and garlic or wild onion, may be separated from good wheat grain and the juices of the garlic and the crushed material removed before the protecting coat of the grain is broken, so that danger of contamination of the inner food substance of the grain will be avoided, when the grain is ground.

Another object of the invention is the provision of a grain separator of this character which may be operated with or without the use of an absorbent material to take up the garlic or other juices, means being provided for feeding an absorbent material to the separator if desired.

With the above and other objects in view, the invention further includes the following novel features and details of construction, to be hereinafter more fully described, illustrated in the accompanying drawings and pointed out in the appended claims.

In the drawings:—

Figure 1:
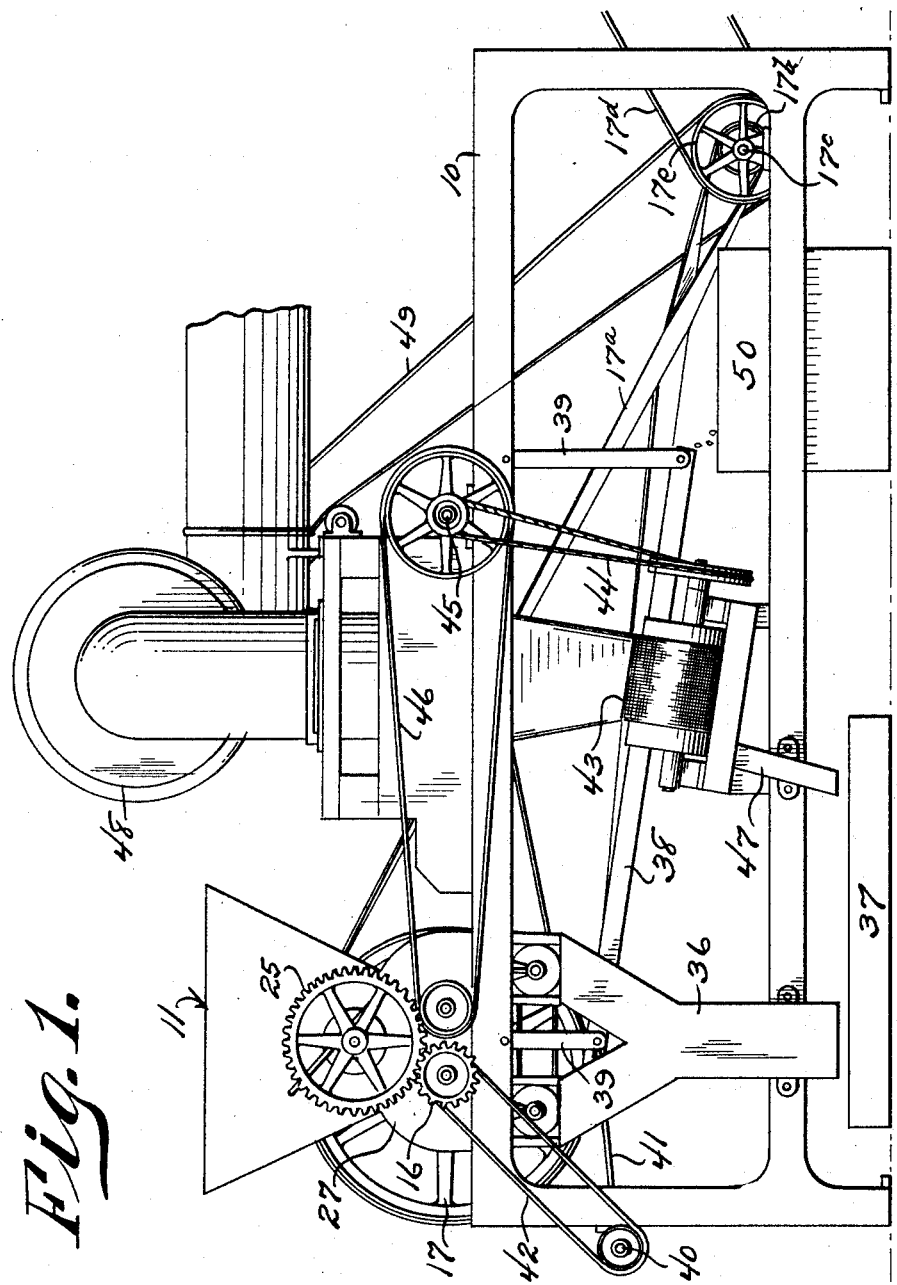
Figure 1 is a side elevation of a separator constructed in accordance with the invention.
Figure 2:
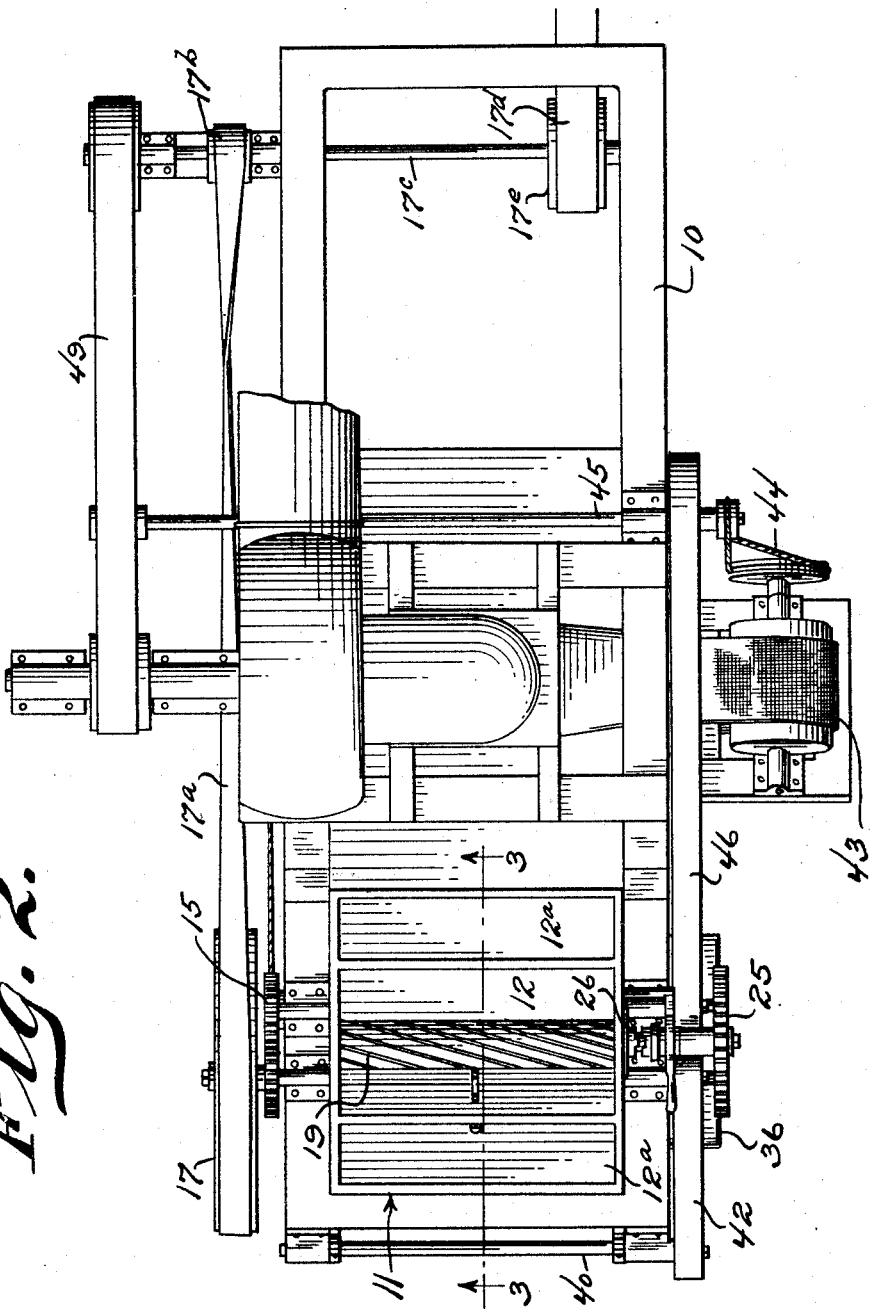
Figure 2 is a top view of the same.
Figure 3:
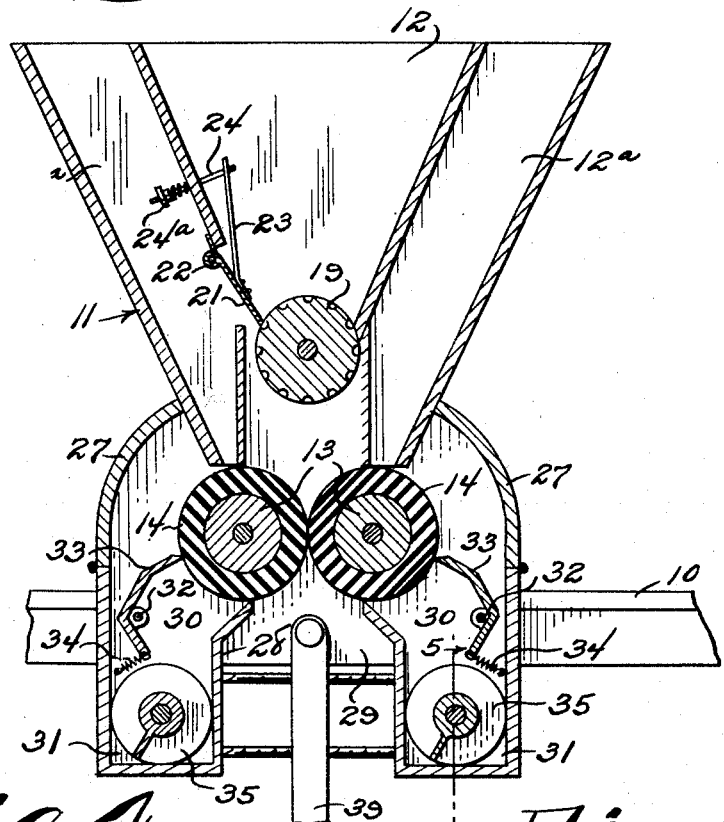
Figure 3 is an enlarged fragmentary section taken substantially on the line 3—3 of Figure 2.
Figure 4:
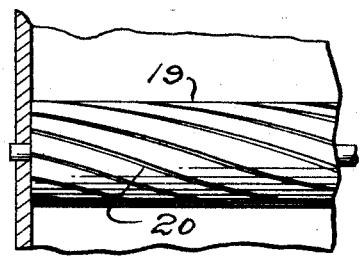
Figure 4 is an enlarged fragmentary section showing the feed roll in elevation.
Figure 5:
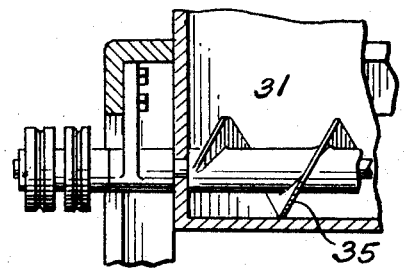
Figure 5 is a fragmentary sectional view taken substantially on the line 5—5 of Figure 3.

Referring in detail to the drawings wherein like characters of reference denote corresponding parts, the reference character 10 indicates the frame of the machine which may be of any suitable structure or design and which supports in any suitable manner, a hopper 11, the latter being designed to hold the material to be separated. This hopper is preferably provided with a central or main compartment 12 and side compartments or auxiliary hoppers $12^a$, the hopper 12 being designed to contain grain to be fed to the machine, while the auxiliary hoppers $12^a$ may be used for the purpose of holding a low grade of flour or similar material. The hoppers $12^a$ may or may not be used as desired.

The lower ends of the hoppers $12^a$ are substantially closed by pressure rolls 13 which are provided with a facing 14 of rubber or other compressible material, the rolls engaging one another at a point substantially central beneath the hopper 12. The facing 14 is of a character to permit of the passage of wheat grains therebetween without injury to said grains, but which will crush "smut" grains and garlic or wild onion passing between them. The rolls 13 have their shafts connected at one end by means of gears 15 so as to provide for their simultaneous operation. One of the rolls 13 has secured upon one end of its shaft a gear 16 and the latter is driven by means of a pulley 17 mounted upon the opposite end of said roll shaft. This pulley is driven by a belt $17^a$ from a pulley $17^b$ which is mounted upon a shaft $17^c$ and this last mentioned shaft is driven from a suitable source of power by means of a belt $17^d$ which passes around a pulley $17^e$.

The material from the hopper 12 is fed to the rolls 13 by means of a feed roll 19 which is spirally grooved as shown at 20 and the periphery of this roll is in contacting engagement with a regulating plate 21. The plate 21 is hingedly mounted as shown at 22 and has extending therefrom an arm 23, while associated with this arm is a spring pressed rod 24 which acts to yieldingly hold the plate 21 in position. The spring of the arm 24 may be regulated by an adjusting nut $24^a$.

The shaft of the roll 19 has secured thereon a gear 25 which is engaged by the gear 16 so as to drive the roll 19 and the operation of the latter is controlled by means of a clutch mechanism 26.

The rolls 13 are mounted within a casing 27 which communicates with the lower ends of the hoppers 12 and $12^a$ and this casing is divided by partitions 28 into a central passage 29 and side passages 30, the latter communicating with conveyor troughs 31. Pivotally mounted within the side passages 30 as shown at 32 are scraper elements 33 which engage the peripheries of the rolls 13 and are yieldingly held in such engagement by means of springs 34. Thus material adhering to the rolls 13 will be scraped therefrom into the passages 30 and directed into the conveyor troughs 31. Operating within these troughs 31 are spiral conveyors 35 which convey the material to a discharge chute 36, a suitable pan or receptacle 37 being arranged to receive the material.

As thus far described, it will be seen that material fed from the hopper 12 will be acted upon by the rolls 13, the good grain or uncrushed material passing directly downward through the passage 29, while the crushed material which will adhere to the rolls 13 will be scraped therefrom by the scrapers 33 and directed to the conveyors 35 and carried outward to the chute 36 as previously explained. If desired, a low grade of flour or similar absorbent material may be placed within the hoppers 12$^a$ so that this material will be taken up by the rolls 13 which operate at the lower ends of the hoppers 12$^a$ and will absorb the garlic or other juices so that the latter will adhere to the rolls 13, together with the crushed "smut" grain, all of the adhering material being removed by the scrapers 33.

The perfect grain will pass uninjured between the rolls 13 as will also the hulls and will fall downward upon an inclined transversely channel-shaped chute 38 which is mounted for swinging movement in the frame of the machine upon hanger rods 39 substantially as disclosed in the application before mentioned. This chute is adapted to be swung longitudinally so as to provide a shaker or agitator and for this purpose there is provided an eccentric upon a shaft 40, a rod 41 serving to connect the eccentric with the chute 38. The shaft 40 is driven by a belt and pulley connection 42 from the shaft of one of the rolls 13.

The reference character 43 designates an endless screen which cooperates with the chute 38 after the manner described in my before mentioned application and this screen 43 may be driven by a belt 44 from a shaft 45, the latter receiving motion by a belt and pulley connection 46 with the other roll 13. The chute 47 conveys extraneous material from the screen 43 to the receptacle 37.

A suction fan 48 which is used as in my application above referred to is driven by a belt and pulley connection 49 from the shaft 17$^c$, while grain from the shaker 38 will fall into a suitable receptacle 50.

The invention is susceptible of various changes in its form, proportions and minor details of construction and the right is herein reserved to make such changes as properly fall within the scope of the appended claims.

Having described the invention what I claim is:—

1. In a grain separator of the character described, a main hopper, auxiliary hoppers mounted at opposite sides thereof and adapted to contain absorbent material, a rotatably mounted feed roll located at the bottom of the main hopper and forming a bottom closure therefor, a pair of coacting resiliently covered rollers located beneath the main and auxiliary hoppers and rotating in opposite directions, said rollers constituting substantially bottom closures for the auxiliary hoppers, a receiver located beneath all of the hoppers and said coacting rollers, said receiver including a central compartment adapted to receive grain passing between said coacting rollers and further including laterally arranged troughs having conveyors therein, and scraper members bearing against said coacting rollers at the opposed portions thereof.

2. In a device of the character described, a main hopper, auxiliary hoppers located at opposite sides thereof, a pair of coacting rollers covered with resilient material located beneath the main hopper and constituting bottom closures for the hoppers, a central receiving compartment located beneath the coacting rollers for receiving grain passing in uncut condition therethru, auxiliary compartments located at the opposite sides of said central receiving compartment and containing conveyors, and spring pressed scrapers mounted within said auxiliary compartments and bearing against the outer portions of said coacting rollers.

In testimony whereof I affix my signature.

JAMES C. PETTIT.